Dec. 1, 1964 D. C. GROCE 3,159,815

DIGITALIZATION SYSTEM FOR MULTI-TRACK OPTICAL CHARACTER SENSING

Filed Nov. 29, 1961

INVENTOR.
DOUGLAS C. GROCE
BY
Sughrue, Rothwell, Mion & Zinn
ATTORNEYS

United States Patent Office 3,159,815
Patented Dec. 1, 1964

3,159,815

DIGITALIZATION SYSTEM FOR MULTI-TRACK OPTICAL CHARACTER SENSING

Douglas C. Groce, Vestal, N.Y., assignor to International Business Machines Corporation, New York, N.Y., a corporation of New York Filed Nov. 29, 1961, Ser. No. 155,669
6 Claims. (Cl. 340—146.3)

The invention relates to a character sensing system and more particularly to one in which an optical scan of an unknown character results in digital signals for analysis and comparison with digital signals indicative of known characters.

The particular embodiment used herein to illustrate the inventive concept involves a continuous sampling of characters by a transducer means viewing the character in sequential vertical segments thereof as the character moves under said transducer means. The transducer means is composed of a plurality of aligned individual transducers, such as solar cells, adapted simultaneously to measure the relative blackness of contiguous discrete areas of the vertical segment being viewed and to generate individual signals from each of said transducers having an amplitude proportionate to said blackness. This amplitude is compared to a threshold amplitude, individual to each transducer, and if it is above said threshold it is passed out by a threshold gate and if it is below said amplitude it is not passed out thereby. The output of the gate is in digital form, varying between one amplitude indicative of a black signal and a second amplitude indicative of a white signal. The plurality of said discrete areas viewed by a particular transducer as the character and therefore the document moves thereunder, defines a horizontal track.

Referring to the above-mentioned threshold, if we assume that this threshold value is constant, then certain difficulties arise. One of these difficulties is due to the variation in the whiteness of the background of the documents. To illustrate this, let it be assumed that document No. 1 has a background whiteness W and a print blackness B. Let it further be assumed that when a particular transducer sees a discrete area wherein black area/white area equals at least 1, that the threshold amplitude is selected so that the threshold gate will pass out the signal generated thereby as a black signal. If document No. 2 has a black area/white area equal to 1, this same transducer should generate an output to produce a black signal also. However, if the whiteness of the background of document No. 2 is whiter than that of document No. 1, then this particular transducer reacts as if the ratio of black area/white area is less than 1 and generates an output which may be equivalent to, for instance, black area/white area equals .75. The threshold gate would not pass out a black signal in this case, since the threshold amplitude we have assumed has been set to pass out black signals only indicative of black area/white area equal to or greater than 1. The present invention overcomes this difficulty by providing means to vary the threshold amplitude as a function of the whiteness of the document background. While this is one of the main contributions of the present invention, it is not the only contribution thereof and merely serves as one example of the utility of this invention. Other contributions will be hereinafter discussed.

It is therefore one object of this invention to provide an optical character sensing system for sensing characters printed on documents wherein means are provided to eliminate errors due to variation in background whiteness of said documents.

It is a further object of this invention to provide such a system in which a plurality of transducers arranged in parallel relationship view contiguous discrete areas along a dimension of the character to provide a digital signal associated with each of the transducers as the scan progresses, wherein the composite digital signals thereby generated identify the character scanned.

It is a further object to arrange said transducers so as to view succeeding vertical segments of said characters as said characters move under said transducers to provide individual time varying digital signals therefrom identified with the individual horizontal tracks prescribed by each transducer.

By virtue of the fact that each horizontal track prescribed by each transducer has associated therewith its own variable threshold, each track is independent of the other. Arising from this is the accomplishment of other objects of the invention.

One of these objects is that the system compensates for variations in the sensitivity of the individual transducers.

Another object is that possible variations of light distribution under the heads is not critical, nor is the possible variation in the intensity of the light source. Then too, variations in background whiteness as well as that between documents is compensated for in each individual horizontal track. Amplifiers associated with each track need not have the same gain or operating point and drift thereof is automatically compensated for.

Therefore, in accordance with the present invention there is provided in a broad sense the following:

A character sensing system for identifying an unknown black character with white background wherein contiguous vertical segments of said unknown character are optically scanned sequentially by a transducer means sensitive to the light reflected from said segments and wherein said transducer means includes a plurality of individual transducers associated with individual contiguous discrete areas of said segments for converting the light impinging thereon to individual electrical signals varying between a maximum signal level and a minimum signal level that comprises a signal channel associated with each of said individual transducers, said signal channel including a maximum signal level dector, a minimum signal level detector, a threshold gate, means to feed the electrical signal output from said channel transducer to said detectors and to said gate, means to bias said maximum signal level detector to provide a maximum signal level output therefrom indicative of a maximum black discrete area seen by said channel transducer, means to bais said minimum signal level detector to provide a minimum signal level output therefrom indicative of a maximum white discrete area seen by said channel transducer, means to bias said gate at a predetermined percentage of the difference between said maximum and minimum signal levels whereby said gate passes only those signal levels above the bias thereof and the outputs of all of said gates to serve to identify said unknown character.

These and other objects of the present invention will become apparent from a more detailed description of the accompanying drawings.

Figure 1:
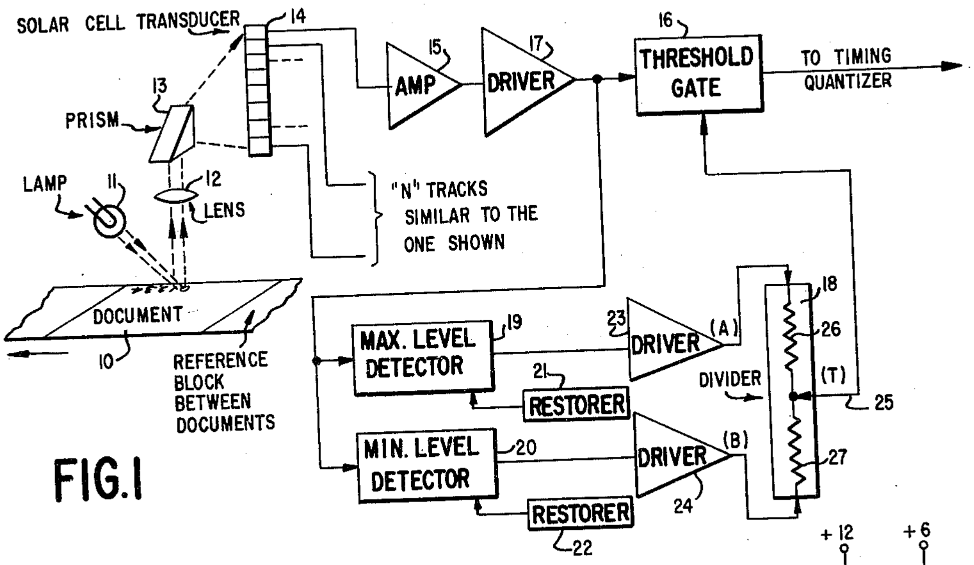
FIGURE 1 is a diagrammatic representation of the optical sensing system constructed in accordance with thet present invention.

Referring first to FIGURE 1, the document 10 is moved by any conventional means under the optical system including the lamp 11, the lens 12 and preferably a prism 13, the prism not being an absolute essential. The light reflected from the document passes through the lens 12 and prism 13 and an image of the document area under the lens is projected onto the transducer means 14. While any radiant energy to electric energy transducer may be employed, for illustration purposes it is considered that the transducer means 14 includes a plurality of solar cells arranged so as to view a vertical segment of each of the characters as they move through the optical sensing system. These cells may be vertically aligned in a single plane or staggered vertically in many planes. Other configurations to accomplish the same end may be used. Preferably, the optical system magnifies the image to facilitate transducer fabrication. White areas under a lens will reflect maximum light to the transducer and black areas will reflect a minimum amount of light. Of course here what is meant by black areas are the dark areas representative of the printed characters and by white area is meant the background or basic document color.

As was previously mentioned, for illustration purposes a solar cell is used as the transducer and a plurality of cells makes up the transducer means. A silicon solar cell may be used. Each of the cells is constructed so as to produce separate horizontal tracks stacked perpendicular to the direction of document movement. The result is a series of small rectangular sensitive areas. Each cell is the input to one of the tracks. The vertical segment of the character being viewed is projected onto the transducer means 14 and will cover several cells simultaneously. Variation of light projected on the cell area as a result of moving a printed document under the lens produces an electrical output from the cell. This figure shows in diagrammatic form, a typical circuit for digitalizing the output of each individual cell. One of these circuits is associated with each of the cells in the transducer means 14. There are, of course, a sufficient number of cells to bridge the entire character. The output of a cell is fed to an amplifier 15. For purposes of explanation, it is assumed that the signal output from the amplifier will be positive with respect to ground and that the most positive signal output therefrom represents a minimum light condition on the exposed cell. It therefore can be said that the more positive the amplifier output is, the higher the degree of blackness seen by its associated solar cell. To initiate the scanning of a document, all of the cells first look at a black surface. The blackness of this surface is adjusted such that the resulting black output from the amplifier is equal to or more positive than the blackest output resulting from printing on the document. This black level from the space between documents is called the "Reference Black" and is normally the most positive level that the amplifier output will reach. This "Reference Black" may also come from a printed character on the document itself or a dark area thereon. After the solar cells have seen the reference black, the document commences its passage under the transducer 14. As the leading edge of the document passes under the transducer, all of the cells thereof will see the background color of this particular document. Therefore, each of the cells and consequently each of the tracks prescribed thereby has now seen the maximum black level and the maximum white level, each at full aperture opening. The particular individual vertical segment of the character printed on the document which the transducer sees and more particularly a discrete area thereof as viewed by an individual solar cell, may or may not completely cover an aperture (the light-sensitive area of the cell), but if the aperture is only partially closed, that is, the cell sees part white and part black, a decision must be made as to whether this degree of closure should be called black or white at the input to the timing quantizer which is fed by the output of the threshold gate 16. The functioning of this timing quantizer will be later explained. The output of the amplifier 15 feeds a driver 17 which serves to provide powering for the voltage divider 18 and also buffering which will reduce the reflections from the threshold gate back into the detector circuits. The output of the driver 17 is fed to a maximum level detector 19 and a minimum level detector 20, each having their respective restorer circuits 21 and 22. The output of the detector 19 feeds the driver 23 and the output of the detector 20 feeds the driver 24. The output of driver 23 is connected to the top of the divider 18 and the output of driver 24 to the bottom thereof. For illustration purposes, the output of driver 23 is indicated as A and that of 24 as B.

Since this is a digitalization system, the output of each of the solar cells must be treated as either indicating a black discrete area or a white discrete area. The problem would be relatively simple, if under all conditions, the solar cell sees either a complete black area or a completely white area. However, problems arise when the aperture is only partially closed, that is, the solar cell sees part white and part black. A decision must be made then as to what percentage of the discrete area covered by black should be indicated as a black area. For purposes of illustration, let it be assumed that the system is to be adjusted whereby if the ratio of black area to white area is 1, that the system is to indicate that this particular discrete area is black and thereby a black signal is generated. To accomplish this the variable tap 25 on the voltage divider is adjusted so that the value of resistance 26 equals that of resistance 27. In this event, the potential at tap 25 fed to the threshold gate 16 will be of an amplitude so as to pass out a signal from the threshold gate 16 to the timing quantizer whenever the signal output from the driver 17 results from a discrete area as seen by the associated solar cell which is at least one-half black and one-half white. All areas which are one-half black or more will provide signals at the output of the driver 17 and therefore to the threshold gate 16, which are of sufficiently high amplitude to overcome the threshold bias provided by tap 25 to the threshold gate. The threshold gate, as will be explained later, includes a two-state device which is flipped to one state indicative of a black signal input to the threshold gate from the driver 17 and to its other state indicative of a white signal output from the driver 17 to the threshold gate 16.

Figures 2, 3:
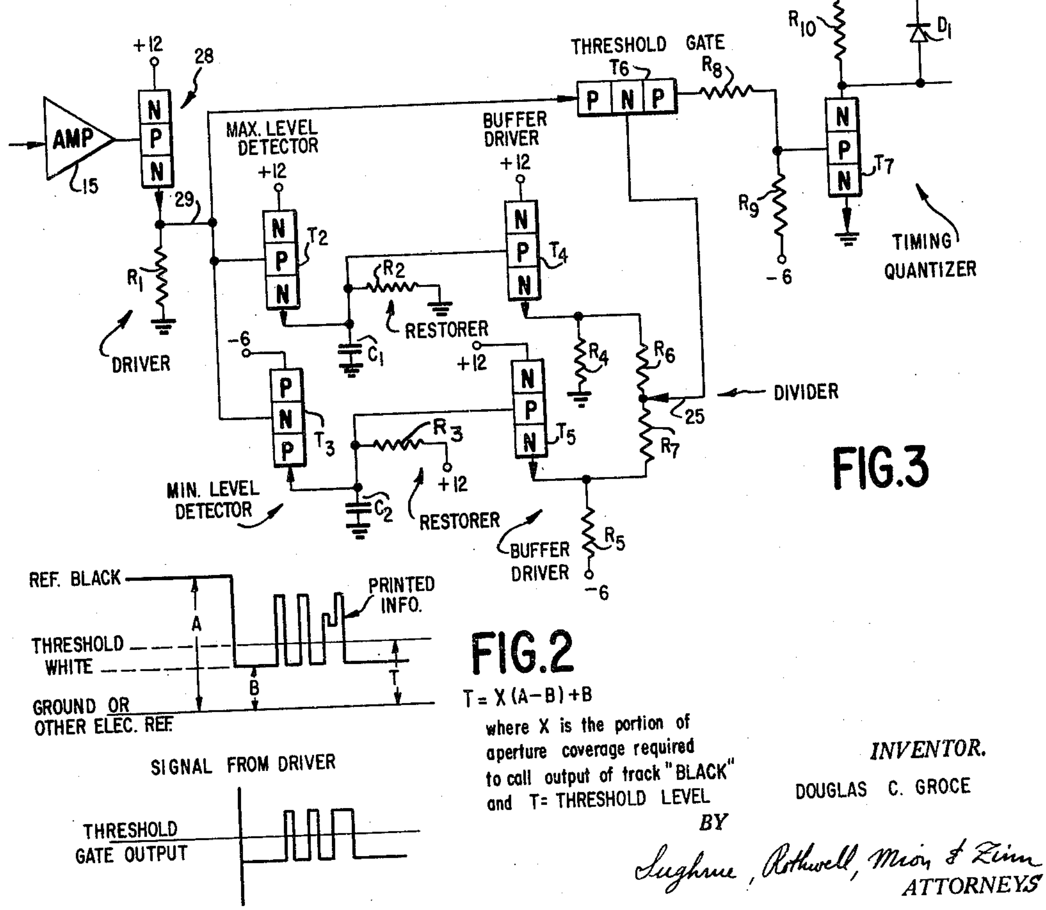
FIGURE 2 is a time versus amplitude curve representative of a typical output of an individual transducer and a typical output of a threshold gate.
FIGURE 3 is a circuit diagram of one type of circuitry which can be used in implementing the optical system constructed in accordance with the present invention.

Referring to FIGURE 2 for a moment, there is shown a first curve representative of the output of the driver 17 which is proportional to the output of its associated solar cell. The reference black has an amplitude of A and reference white an amplitude of B. The threshold value is set at an amplitude of T. In a second curve below the first, the output of the threshold gate 16 is shown in time relation to the output of the driver 17. It can be seen that for the amplitudes above the threshold value, the output of the gate is maintained at a first level and at a second level for amplitudes below this threshold value. The timing quantizer to which all of the threshold gate outputs is fed, effectively integrates the black signal pulse periods and arrives at a total integrated value for the character scanned. This value is compared with values for known characters and by means not pertinent to this invention, a decision is made thereby identifying the character scanned. The output from the threshold gate and therefore the input to this timing quantizer will be only that portion of the signal output of the driver 17 that is blacker than the threshold level. This signal now represents the printing that has sufficiently covered the cell aperture by more than the selected percentage.

Referring now to FIGURE 3, there is shown one form of circuitry which may be used to implement the diagrammatic circuit shown in FIGURE 1. The output from a particular solar cell is fed to the amplifier 15. When this cell is looking at the reference black, it provides a minimum positive signal to the input of the amplifier which by inversion provides a maximum positive signal at the output thereof to the base of the NPN transistor $T_1$. This transistor has its collector directly connected to +12 volts and its emitter through resistor $R_1$ to ground. Under the conditions just assumed, that is, with the cell looking at the reference black area, this transistor is highly conductive. The potential on line 29 connected to the emitter of transistor $T_1$ is at a maximum positive value. This transistor $T_1$ constitutes the driver 17 of FIGURE 1. This maximum positive potential of the emitter of $T_1$ is applied directly to the base of the NPN transistor $T_2$ constituting the maximum lever detector 19 of FIGURE 1. The collector of this transistor is connected to +12 volts and the emitter through condenser $C_1$ to ground. Due to the application to the base of transistor $T_2$ of the maximum positive potential, this transistor is highly conductive and charges condenser $C_1$ to a maximum positive potential. Resistor $R_2$ is connected in parallel with input impedance of transistor $T_4$ and controls the discharge of capacitor $C_1$. The time constant of this circuit is made long with respect to the time the document is under the transducer. Thus far it is seen that the condenser $C_1$ is charged up to a level representative of the reference black level seen by the solar cell. At this time due to the potential on line 29, the PNP transistor $T_3$ is cut off.

Transistor $T_3$ is representative of the minimum level detector 20 of FIGURE 1. It will be switched on only when the solar cell associated therewith is exposed to the most white level. It will cut off when a positive black shift occurs as when the characters appear under the transducer. In the particular case under consideration in which the cell sees the reference black level, this transistor is cut off. When, however, the document moves under the transducer and the solar cell sees the white background of the document, the input to the amplifier will be at a relatively high potential and the output therefrom at a relatively low potential, positive in polarity. This means that transistor $T_1$ is relatively nonconducting and the potential of line 29 approaches ground. This being the case, transistor $T_2$ is shut off but $T_3$ is relatively highly conducting. This means that there is considerable current flow through resistor $R_3$ which constitutes the restorer 22 of FIGURE 1 and is arranged in parallel with the input impedance of transistor $T_5$. Therefore, the voltage on the emitter of the transistor $T_3$ will be at a relatively low positive potential. The time constant associated with the condenser $C_2$ is shorter than that in the maximum level circuit since it is only required to be long with respect to the maximum time that black, due to the printed character, will be under the head and it must be short enough to allow the minimum level detector to reset to the white level of the next document which may be darker than the white level of the previous document.

Now, we have seen the establishment of potentials across $C_1$ and $C_2$ indicative respectively of the reference black and the white background of the document being scanned. The black reference level potential across condenser $C_1$ is applied to the NPN transistor $T_4$ at the base thereof and the white background potential is applied to the base of the NPN transistor $T_5$. These are emitter followers both having their collectors connected to +12 volts and in the case of transistor $T_4$, its emitter is connected through the resistor $R_4$ to ground. In the case of transistor $T_5$, its emitter is connected through resistor $R_5$ to −6 volts. Transistors $T_4$ and $T_5$ with their associated circuitry constitute the buffer drivers 23 and 24 of FIGURE 1. The emitter potential of $T_4$ is connected to the top of the voltage divider including resistors $R_6$ and $R_7$ and the emitter potential of transistor $T_5$ is connected to the bottom thereof. These two resistors correspond to resistors 26 and 27 of FIGURE 1. The variable tap 25 associated with the voltage divider including resistors $R_6$ and $R_7$ is set whereby the following equality exists:

$$\frac{R_6+R_7}{R_7}=\frac{\text{Total cell area}}{\text{Minimum cell area coverage to give a black output}}$$

The voltage level at the junction between $R_6$ and $R_7$ is the threshold level. This level is supplied to the base of transistor $T_6$. This transistor is a PNP transistor and in conjunction with resistors $R_8$ and $R_9$ the −6 voltage supply and transistor $T_7$ with associated circuitry constitutes the threshold gate identified as 16 in FIGURE 1. When the output of the driver $T_1$, and therefore the input to transistor $T_6$ becomes more positive, that is, the cell looks at a discrete area having a higher percentage of black than as set by the threshold level cooperating with the voltage divider, transistor $T_6$ will turn on. This will cause the base of the PNP transistor $T_7$ to go positive with respect to ground. Transistor $T_7$ will conduct causing its collector to approach ground. This transistor $T_7$ together with its associated circuitry including $R_{10}$ connected between +12 volts and the collector and the diode $D_1$ having its plate connected to the collector and its cathode to +6 volts, constitutes a two-state device for feeding the input stage of the timing quantizer. The emitter of this ransistor is connected to ground. The output for black at the collector of transistor $T_7$ is ground and for white is +6 volts as controlled by the diode $D_1$.

Let it now be assumed that document No. 2 is going to be scanned. As previously referred to, the transducer is exposed between documents to the reference black. The time constant of $C_1$ and $R_2$ in the maximum level detector is relatively long and consequently little leakage occurs. However, the condenser will be recharged to the reference black level. On the other hand, the time constant of the condenser $C_2$ with resistor $R_3$ is shorter than that associated with the RC circuit of the maximum level detector. It can therefore adjust itself to the whiteness of the next document. Let it be assumed that document No. 2 is whiter than document No. 1. Let it further be assumed that the voltage divider 18 has been set so that the variable tap is positioned whereby $R_6$ equal $R_7$. This sets the threshold level so that it will pass out a black signal if the black area seen by a solar cell occupies at least 50% of the total area thereof. Now, in the case where the document No. 2 is whiter than document No. 1, a solar cell seeing a one-half black in a one-half area wherein the white area is brighter in document No. 2 than in document No. 1, would provide an output from the driver transistor $T_1$ which should be passed by the threshold gate transistor $T_6$. However, since the aperture of the cell is more open, less of a black signal amplitude will result. In order that it will so pass through this gate with less black signal amplitude, the threshold level must be adjusted in a negative direction. This is accomplished as follows:

The increased whiteness of document No. 2 background provides relatively higher positive potential input to the amplifier 15 and the output thereof will reduce the current flow in transistor $T_1$. This means that the potential applied to the base of $T_3$ will be more negative causing it to conduct more and drive the voltage on its emitter down. The emitter follower $T_5$ then would apply to the bottom of the voltage divider and more particularly to the bottom of resistor $R_7$ a more negative potential than that associated with document No. 1. This shifts the potential at tap 25 in a negative direction. This decreases the voltage applied to the base of $T_6$ and thereby permits this gate to pass a signal of lesser amplitude supplied to the emitter thereof as a result of the output of driver transistor $T_1$. It can be seen by similar logic that if document No. 2 were not as white as document No. 1 then the white level potential applied to the voltage divider at $R_7$ would be more positive than before and the base potential of $T_6$ would move in a positive direction thereby requiring more of a positive output from the driver transistor $T_1$ in order to turn this gate on.

It can be seen then, that the minimum level detector because it has a realtively fast drift rate, follows as closely as possible any variations in background color. With a detector of this nature, it is possible to hold or return to the most white level of the input at any time within a document. On the other hand, drift rate of the maximum level detector is relatively negligible but will respond to changing conditions in the system having a rate of change comparable with the slow drift rate of this detector. For instance, such conditions may be the variations in the sensitivity of the transducer cells, variations in the intensity of the light source, drift, gain or operating points of the amplifiers.

It is noted here that certain polarities associated with black and white levels are assumed. It is certainly within the skill of a worker in the art to reverse these polarities with accompanying changes in circuitry.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. A character sensing system for identifying an unknown black character with white background wherein contiguous segments of said unknown character are scanned sequentially by a transducer means sensitive to radiant energy reflected from said segments and wherein said transducer means includes a plurality of individual transducers associated with individual continuous discrete areas of said segments for converting the radiant energy impinging thereon to individual electrical signals that comprises a signal channel associated with each of said individual transducers, said signal channel including a maximum signal level detector, a minimum signal level detector, a threshold gate, means to feed in parallel separate paths the electrical signal output from said channel transducer to said detectors and to said gate, means to bias said maximum signal level detector to provide a maximum signal level output therefrom indicative of a maximum black discrete area seen by said channel transducer, means to bias said minimum signal level detector to provide a minimum signal level output therefrom indicative of a maximum white discrete area seen by said channel transducer, means to bias said gate at a predetermined percentage of the difference between said maximum and minimum signal levels whereby said gate passes only those signal levels above the bias thereof and the outputs of all of said gate serve to identify said unknown character.

2. A character sensing system as defined in claim 1 wherein said gate includes a two-state device providing a first signal level output therefrom when in the first of said states and a second signal level output therefrom when in the second of said states, means to switch said device to the first of said states when the level of said electrical signal output from said channel transducer fed to said gate is above the bias thereof and to switch said device to the second of said states when said channel transducer output level fed to said gate is below the bias thereof whereby a digitalized output signal is obtained therefrom.

3. A character sensing system as defined in claim 1 wherein said transducers are solar cells.

4. A character sensing system as defined in claim 1 wherein said maximum and minimum signal level detectors both include a condenser, means to charge said condensers to the bias for said detectors and each of said detectors also includes a resistor controlling the rate of discharge of said condensers.

5. A character sensing system as defined in claim 4 wherein the RC time constants of the RC circuit of said maximum signal level detector is greater than that of said minimum signal level detector.

6. A character sensing system as defined in claim 5 further including a voltage divider, means to feed said maximum signal level to one end of said voltage divider and said minimum signal level to the other end of said voltage divider and means to tap off from said divider the bias for said gate.

References Cited in the file of this patent

UNITED STATES PATENTS 3,037,077 Williams et al. ---------- May 29, 1962